United States Patent [19]

Dall et al.

[11] Patent Number: 4,659,455
[45] Date of Patent: Apr. 21, 1987

[54] PROCESS FOR WITHDRAWING CATALYST PARTICLES FROM A REACTION ZONE

[75] Inventors: Didier Dall, Lyons; Jean-Paul Euzen, Dardilly; Rémy Patoux, Oullins; Pierre Renard, Saint Nom la Breteche, all of France

[73] Assignee: Institut Francais du Petrole, Rueil-Malmaison, France

[21] Appl. No.: 699,376

[22] Filed: Feb. 7, 1985

[30] Foreign Application Priority Data

Feb. 7, 1984 [FR] France ................................ 84 02035

[51] Int. Cl.⁴ ........................ C10B 31/02; C10B 31/12
[52] U.S. Cl. .................................. 208/152; 208/153; 208/165; 208/113; 208/108; 208/209
[58] Field of Search ............... 208/143, 146, 152, 157, 208/148, 153, 106, 107, 108, 113, 209, 165, 111, 120, 251 H, 171; 422/141, 140, 147, 145, 213, 214, 216, 178; 210/189

[56] References Cited

U.S. PATENT DOCUMENTS

| 2,257,178 | 9/1941 | Martin et al. | 208/146 |
| 2,761,769 | 9/1956 | Elder | 208/157 X |
| 2,846,371 | 8/1958 | Halik | 422/216 X |
| 2,893,945 | 7/1959 | Berg | 422/216 X |
| 3,173,858 | 3/1965 | McClure | 208/148 |
| 3,716,478 | 2/1973 | Kodera et al. | 208/152 |
| 4,187,169 | 2/1980 | Euzen et al. | 208/157 |
| 4,295,967 | 10/1981 | Kurima et al. | 422/216 X |
| 4,444,653 | 4/1984 | Euzen et al. | 208/152 |
| 4,478,707 | 10/1984 | Bischoff et al. | 208/153 X |

FOREIGN PATENT DOCUMENTS 522789 1/1981 Australia .
2504821 11/1982 France .

*Primary Examiner*—Glenn Caldarola
*Attorney, Agent, or Firm*—Millen & White

[57] ABSTRACT

The invention concerns a process for withdrawing catalyst, particularly from a moving bed.

The device is characterized in that fins (4) (see FIG. 1A), shaped as corner-plates, are arranged, on a plate (6) which supports the catalyst bed radially around each vertical duct for catalyst withdrawal, so that the flow of catalyst particles converges towards the withdrawing ducts.

The apparatus is useful for example in hydroconversion reactions, particularly in hydrotreatments of heavy oil cuts.

5 Claims, 19 Drawing Figures

PROCESS FOR WITHDRAWING CATALYST PARTICLES FROM A REACTION ZONE

The present invention concerns a process and its operation, as well as an apparatus adapted for said operation, for the treatment of a fluid charge (liquid and/or gas) through a catalyst bed of solid particles.

The invention is particularly applicable to catalytic treatments of oil cuts in the presence of a gas mixture of high hydrogen content, to hydroconversion, hydrotreatments of heavy cuts (vacuum residues, for example) or non conventional heavy crude oils.

During these catalytic treatments, frequently a rapid deactivation of the catalyst occurs as a result of the presence of catalyst poisons, coke formation, deposit of certain metals . . . etc.

In the present process, the catalyst withdrawal from the reactor is "progressive", which means that the catalyst may be withdrawn:

either periodically by fractions of the catalyst volume, at time intervals, and, for example, at a frequency of 1/10 day to 10 days, this technology of catalyst withdrawal from the bottom of the reactor having the advantage of not disturbing the remainder of the catalyst bed, maintained in activity. Optionally a stratification of catalyst particles layers may thus be created: the withdrawn fraction is replaced with an identical volume of fresh catalyst at the top of the reactor or of the reaction zone : this is called a semi-moving bed, or periodically, in totality (fixed bed).

or continuously, the catalyst withdrawal being then associated with the supply of replacing fresh catalyst at the top of the reaction zone (moving bed).

According to the principle of the invention the shape and the size of the solid particles do not affect the performances of the claimed process and device.

Thus the process and the apparatus can also be used for withdrawing particles of catalyst used in reactions of hydrodemetallation, hydrodesulfurization, cracking, hydrocracking, hydroreforming, manufacture of aromatic hydrocarbons, isomerisation of paraffinic, naphthenic or aromatic hydrocarbons, various reactions of hydrogenation, hydrotreatment, dehydrogenation, alkylation, transalkylation, hydrodecyclization, hydrodealkylation, hydrovisbreaking treatments, etc. reactors in which the injected charge and/or gases flow upwardly.

The fluid charge, whose major part passes upwardly through the catalyst bed, may be introduced into the reactor or the reaction zone through one or more pipes, the moving or semi-moving catalyst bed circulating in counter-current thereof fashion thereto. The fluid charge distrubution members are arranged on a distribution plate acting as support for the catalyst bed during the periods where no catalyst is withdrawn. The inlet pipes for conveying fluids to the distribution members are located below said plate, hence in a zone entirely free of solids.

The counter-current flow of the charge and the catalyst provides for a high rate of catalytic conversion since the fresh catalyst introduced at the top of the reactor treats an almost entirely converted charge (i.e., containing essentially compounds whose conversion is difficult), whereas, at the bottom of the reactor, the used catalyst treats a fresh charge (i.e. containing mainly compounds easy to convert), thus performing in an efficient manner the first stages of the conversion. This technique results in a more systematic use of the catalyst in the reactor, in a more regular heat profile of the catalyst bed than with a flow of the cocurrent type, with, especially, a moderate temperature at the bottom of the reactor which reduces the risk of catalyst coking.

OBJECT OF THE INVENTION

An object of the invention concerns a technique of catalyst withdrawal and of fluids injection into the reactor not requiring the use of supporting grids of conical or pyramidal shape, as generally used with progressively withdrawn catalyst beds.

French Pat. No. 2 504 821 discloses a technique using this type of conical or pyramidal internal member.

BACKGROUND OF THE INVENTION

The process according to the invention originates from a technique consisting of only fluidizing the lower layers of the moving or semi-moving or fixed bed so as to discharge more easily the catalyst particles, the upper layers of the catalyst bed remaining as moving bed or fixed bed. U.S. Pat. No. 3 716 478 teaches a similar principle whereby a correct fluidization is achieved at the bottom of the reactor by acting on the charge feed rate at the reactor bottom and by transporting, generally through a pump, the catalyst particles for discharging them from the reactor. However, in this above mentioned U.S. patent, the paths of the catalyst particles are irregular and difficult to control and hence produce an irregular flow, not compatible with the required progressive lowering of the whole bed in the reactor ; these disadvantages are strengthened when using a reactor of large diameter, more and more used in refining operations.

The present invention meets a need of simplification and particularly relates to reactors of very large diameters.

SUMMARY OF THE INVENTION

This object can be achieved by the process and the device according to the invention, as described below:

The particles to be withdrawn, contained in the "reactor" or enclosure, shaped as a substantially vertical elongate revolution volume, are "progressively" introduced at the upper part of the enclosure and "progressively" withdrawn from the lower part thereof, after a downward flow therethrough, whereas the fluid charge is introduced (at least partly) in the lower part of the reactor; the particles are withdrawn through one or more vertical ducts of sufficient diameter to convey the catalyst out of the enclosure.

The upper end of the withdrawing duct(s) is mechanically connected to the fluid charge distribution plate.

The device according to the invention comprises the arrangement, on the distribution plate, of triangular or trapezoidal internal plates whose position and orientation are so determined as to define zones wherein the local fluid velocities are higher than the nominal velocities through the bed itself, extending into the upper zone, and so as to generate solid streams parallel flow, thus avoiding any dead zone of unwithdrawable catalyst at the bottom of the reactor.

This device according to the invention is also characterized by the number and the location of gas injection holes, generating a sufficient pressure drop through the distribution plate to form a gas cushion under said plate, as well as by the number, the location and the shape of "spray-tips" or "nozzles" for distributing liquid by spraying it from the zone below the plate to the upper zone containing the catalyst bed.

BRIEF DESCRIPTION OF THE DRAWINGS

The invention will be further illustrated by the accompanying drawings wherein.

DETAILED DESCRIPTION OF THE INVENTION

Figure 1A:
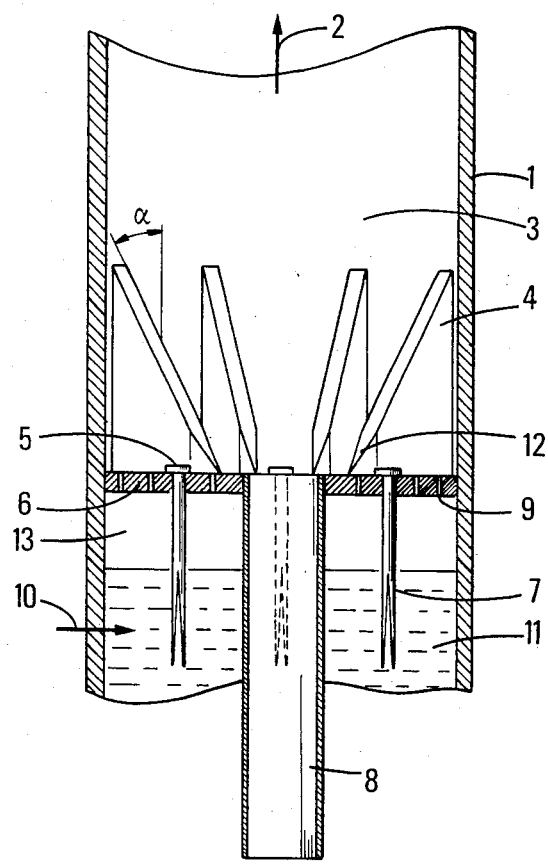
FIGS. 1 and 1A show an embodiment of the device of the invention with a single withdrawing duct.
Figure 1:
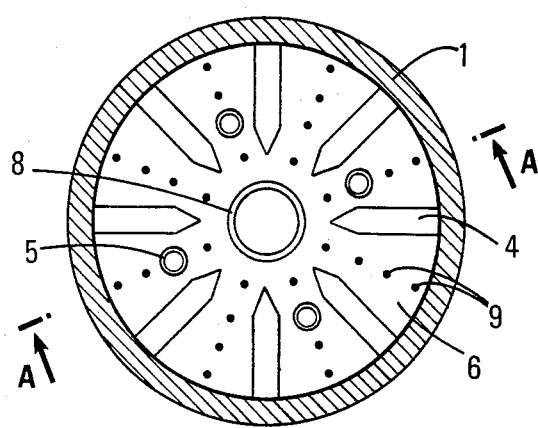
Figure 8:
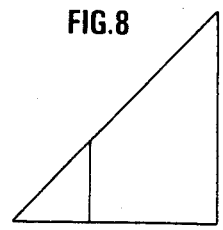
FIGS. 8, 8A, 9 and 9A illustrate different arrangements of triangular or trapezoidal internal plates.
Figure 8A:

FIGS. 1 and 1A (cross-sections) diagrammatically show a first embodiment of a catalytic treatment device with progressive catalyst withdrawal.

Reactor 1 (see FIGS. 1 or 1A) comprises, in its upper part, means (not shown) to feed the catalyst bed (3) with fresh (new or regenerated) catalyst. Charge (10) is introduced at the bottom of the reactor. The catalyst flows by gravity through the reactor (counter-currently) with the charge circulating in the direction of arrow (2) and is discharged through duct (8) to the outside of the enclosure.

The arrangement of radial internal plates (4), here having a triangular shape, speeds up the particles in the lower zone, destroying the accumulations liable to be formed in the dead zones during the withdrawal. The angle $\alpha$ characterizing the inclination of the internal plates is equal to or greater than the value of the internal friction angle characteristic of the catalyst.

FIGS. 8, 8A, 9 and 9A show two possible embodiments complying with these requirements. The thickness of the fin may be progessively reduced in the vicinity of the withdrawing duct (8) to facilitate the catalyst discharge. Here, the assembly of internal plates is mounted on a distribution plate (6) provided with gas injection holes (9), and/or liquid distribution spray-tips (5) depending on nature of the fluid charge to be treated. The diameter of the gas distribution holes must be such that the pressure drop therethrough be 0.1–1.5 kgf/cm$^2$ (9806–147 100 Pa), preferably about 0.2 kgf/cm$^2$ (19 614 Pa); moreover, their size is limited by the minimum size of the catalyst particles contained in the reactor (1) so as to prevent any catalyst leakage into the distribution chamber (11). The liquid distribution spray-tips (5) may have various shapes adapted to favour a decompression of the inter-fins zones.

FIGS. 3, 3A, 4, 4A, 4B, 5, 5A, 5B, 6, 6A, 6B, 7 show different embodiments of spray-tips: each spray-tip is supplied by a feeding pipe (7) (FIG. 1A), passing through the gas cushion (13) created below the distribution plate (6) and dipping into the liquid "hold-up" or liquid reserve at the bottom of the reactor. Each feeding pipe (7) is generally slotted over a length which is preferably equal to the total length of tube (7) less the thickness of the gas cushion (13) (for example a triangular slot), so as to autostabilize the thickness of the gas cushion.

Accordingly, the invention concerns a process for progressive withdrawal of catalyst particles during the catalytic treatment of a fluid charge (10) (see FIG. 1 or 1A) in a reaction zone (1) substantially vertical, elongate and cylindrical, containing a catalyst bed (3), said catalytic treatment consisting of:

(a) progressively circulating the catalyst downwardly through the reaction zone, counter-currently with said charge, while maintaining said catalyst in the reaction zone by support means (6) of a shape adapted to correspond substantially to a section of the reaction zone, said supporting means being provided at the lower part of the reaction zone, (b) periodically or continuously fluidizing the lower part of the catalyst bed and progressively discharging the catalyst from the reaction zone through at least one withdrawing duct (8) extending from the lower part of the reaction zone, and (c) upwardly circulating the fluid charge formed of a liquid and a gas, by first introducing the major part of the charge in the lower part of the reaction zone, by injecting the major part of the gaseous phase of the charge into the catalyst bed through a plurality of holes (9) provided in said support means and by introducing a major part of the liquid phase of the charge into the catalyst bed through a plurality of substantially vertical pipes (7), the liquid phase and the gas phase being optionally introduced together or separately through one or more injection pipes, the lower end of each pipe dipping from the bottom of the reaction zone into said liquid charge and the upper end of each pipe opening above said support means, the process for withdrawing the catalyst particles being characterized in that:

in order to favour the withdrawal of the catalyst particles from the reaction zone, at least a portion of said particles is moved through at least one flared zone shaped as a cone or a pyramid turned upside down, whose vertical axis substantially coincides with the axis of a substantially vertical withdrawing duct, said flared zone being discontinuous and formed of a plurality of elongate and narrow members each shaped as a substantially triangular or trapezoidal (or of equivalent shape) strip optionally with a thinner lower end, the axes of the strips of a given flared zone substantially converging towards the substantially vertical axis of a given withdrawing duct (8), so as to induce, inside the one or more flared zones, the motion of the catalyst particles towards at least one of said withdrawing ducts, the angle ($\alpha$) of the axis of one of said withdrawing ducts with a generatrix of the cone frustrum (when the flared zone is frustro-conical) or with one edge of the pyramid (when the flared zone is pyramidal) being about from 30 to 70 degrees (preferably 40–50 degrees), in order to orient the assembly of catalyst particles towards a withdrawing duct and to move towards a withdrawing duct the catalyst particles which have passed below said flared zone, between said strips, and thus to prevent accumulations of particles which might be formed between said support means (6) and said strips, the catalyst particles in the lower part of the reaction zone and above the support means are fluidized by injecting through said catalyst bed support means the liquid and gaseous charge, the pressure drop for the gases through the support means ranging from 0.1 to 1.5 kgf/cm$^2$ (9806 to 147 100 Pa), each of said ducts for introducing the liquid phase being substantially discontinuous over at least a portion of said duct dipping into the liquid at the bottom of the reactor.

The apparatus according to the invention (see FIGS. 1 or 1A) comprises:

a substantially vertical reactor (1) substantially of elongate and cylindrical shape, means for introducing solid particles in the upper part of the reactor, means for withdrawing solid particles from the lower part of the reactor, essentially consisting of at least one substantially vertical duct (8), a plate (6) supporting said solid particles, at the lower part of the reaction zone, so perforated as to give passage to ducts such as (8), means for introducing a fluid charge consisting of a liquid and a gas through the lower end of the reactor, below said plate (6), the liquid and the gas being thus introduced into the reactor through a single line or separate lines, devices for injecting a gas through said plate and liquid injection devices passing through said plate, said devices essentially comprising, a plurality of holes (9) provided in said plate (6) essentially for introducing gas and feeding pipes (7) essentially for introducing the liquid charge, these essentially vertical feeding pipes passing through said plate, so that the upper end of a pipe is above the plate and the lower end of a pipe in the lower part of the reactor.

The apparatus is characterized in that:

above said supporting plate, around the one or more ducts for withdrawing solid particles, are arranged elongate strips, preferably of hard and abrasion resistant material, each having substantially a triangular, trapezoidal of equivalent shape, and whose width may be decreased (for example, progressively) at their lower end (12), near said plate, said strips forming together, around a given withdrawing duct, a discontinuous flared zone of frustro-conical or pyramidal shape, but oriented upside down, i.e. with the apex oriented towards the reactor bottom, the lower end of each strip being in contact with, or being laid on said plate, the angle ($\alpha$) of the axis of the withdrawing duct with a generatrix of the flared zone when the latter is frustroconical or with an edge thereof when the latter is of pyramidal shape, ranging from 30 to 70 degrees, preferably from 40 to 50 degrees.

said feeding pipes (7) are provided with a substantially triangular narrow slot, along their lower part.

Preferably, each strip is supported by the edge of a substantially vertical fin or plate (4) (see FIGS. 1 or 1A), shaped substantially as a right-angled corner plate (eventually as a right-angled trapezium) whose hypothenuse consists of said edge supporting said strip. These fins are arranged substantially radially with respect to the associated withdrawing duct.

Figure 9:
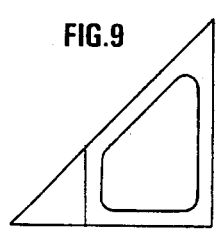
Figure 9A:
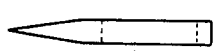

Said fins may be fabricated of a solid or at least partially recessed material. Together they define, above the support plate, a plurality of compartments. FIGS. 8, 8A, 9 and 9A exhibit a triangular fin whose thickness is reduced at its lower end. The fin of FIGS. 9 or 9A is recessed.

Figure 2:
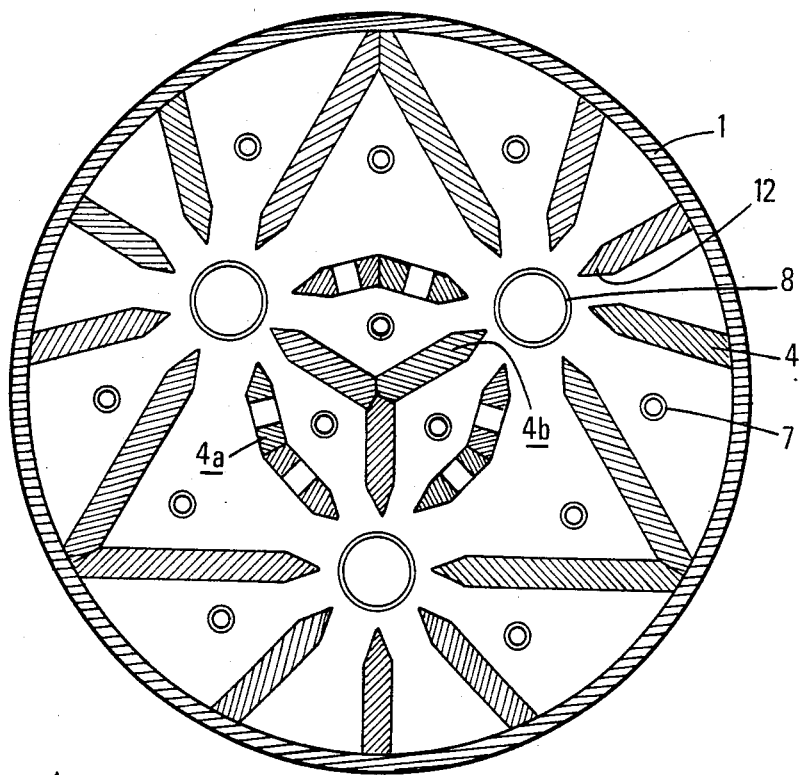
FIG. 2 is a view from above of an embodiment of the device according to the invention comprising several withdrawing ducts.
Figure 3:
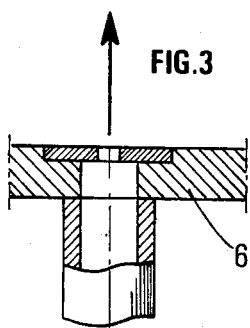
FIGS. 3, 3A, 4, 4A, 4B, 5, 5A, 5B, 6, 6A, 6B and 7 illustrate different types of distribution spray-tips.
Figure 3A:
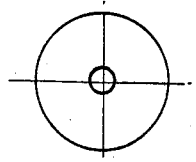
Figure 4:
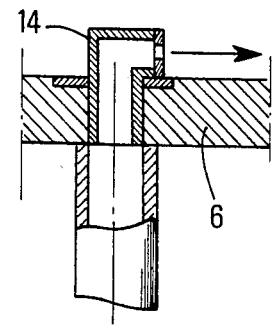
Figures 4A, 4B:
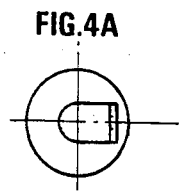
Figure 5:
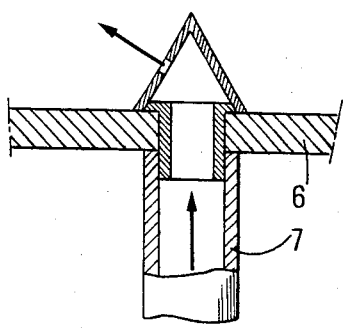
Figure 6:
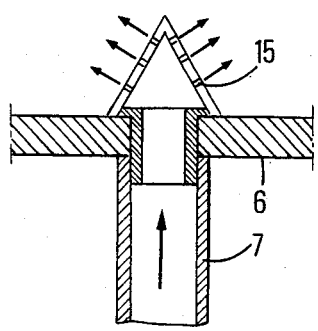
Figure 5A:
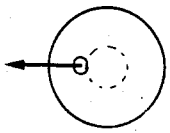
Figure 5B:
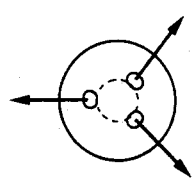
Figure 6A:
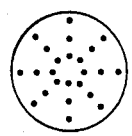
Figure 6B:
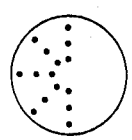
Figure 7:
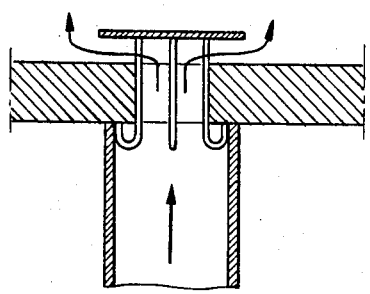

When the apparatus comprises a plurality of ducts (8) (see FIG. 2) toward each of which is oriented a system of inclined strips, said strips are placed on the thin edge of the fins, and the fins which are not located at the periphery of the reactor, have optionally the shape of several corner plates or right-angled triangles, solid or recessed, at least partially joined to each other, the so-defined fins (4a) or (4b) carrying strips which then pertain to different gathering systems.

Preferably, each liquid feeding pipe (7) (see FIGS. 3, 3A, 4, 4A and 4B) is provided at its upper end with at least one nozzle (14) located above the support plate (6) and oriented in a direction substantially parallel to said plate. According to another preferred embodiment (see FIGS. 5, 5A, 5B, 6, 6A and 6B) the upper end of the feeding pipe (7), above plate (6), is covered with a protective roof-like member of triangular, pyramidal or similar shape, liquid injection orifices being provided in said roof member so that the liquid injected through said orifices be oriented substantially perpendicularly to the roof-member.

What is claimed as the invention is:

1. A process for progressively withdrawing catalyst from a catalyst bed contained in a substantially vertical, elongate and cylindrical reaction zone during the catalytic treatment therein of a fluid charge, said catalytic treatment comprising:
    (a) progressively circulating the catalyst downwardly through the reaction zone, counter-currently with said charge, while maintaining said catalyst in the reaction zone by support means of a shape adapted to correspond substantially to a section of the reaction zone, said support means being provided at the lower part of the reaction zone,
    (b) periodically or continually fluidizing the lower part of the catalyst bed and progressively discharging the catalyst from the reaction zone through at least one withdrawal duct extending from the lower part of the reaction zone, and
    (c) upwardly circulating the fluid charge formed of a liquid and a gas, by first introducing the major part of the charge in the lower part of the reaction zone, by injecting the major part of the gaseous phase of the charge into the catalyst bed through a plurality of holes provided in said support means and by introducing a major part of the liquid phase of the charge into the catalyst bed through a plurality of substantially vertical pipes, the lower end of each pipe dipping from the bottom of the reaction zone into said liquid charge and the upper end of each pipe opening above said support means, the process for withdrawing the catalyst particles comprising:
        moving at least a portion of the catalyst said particles through at least one flared zone shaped as an inverted cone or a pyramid, whose vertical axis substantially coincides with the axis of a substantially vertical withdrawing duct, said flared zone being discontinuous and formed of a plurality of elongate and narrow members each shaped as a substantially triangular or trapezoidal strip, the axes of the strips of a given flared zone substantially converging towards the substantially vertical axis of a given withdrawing duct, so as to induce, inside the one or more flared zones, the motion of the catalyst particles towards at least one of said withdrawing ducts, and an angle ($\alpha$) being about from 30°–70°, said angle $\alpha$ being defined as the angle of the axis of one of said withdrawing ducts with either (i) a generatrix of the cone frustrum when the flared zone is frustroconical or (ii) with one edge of the pyramid when the flared zone is pyramidal,
        in order to orient the assembly of catalyst particles towards a withdrawing duct and to move towards a withdrawing duct the catalyst particles which have passed below said flared zone, between said strips, and thus to prevent accumulations of particles which might be formed between said support means and said strips, fluidizing the catalyst particles in the lower part of the reaction zone and above the support means by injecting through said catalyst bed support means the liquid and gaseous charge, the pressure drop for the gases, through the support means ranging from 0.1 to 1.5 kgf/cm², each of said ducts for introducing the liquid phase being substantially discontinuous over at least a portion of said duct dipping into the liquid at the bottom of the reactor.

2. A process according to claim 1, wherein angle α ranges from 40 to 50 degrees.

3. A process according to claim 1, wherein the gas pressure drop through the support means is about 0.2 kgf/cm².

4. A process according to claim 1, wherein said treatment comprises the catalytic hydrotreatment of heavy oil cuts or heavy crude oils.

5. A process according to claim 1, wherein said catalytic treatment comprises at least one of the following: hydrometallation, hydrosulfurization, cracking, hydrocracking, hydrotreatment and hydrovisbreaking.

* * * * *